United States Patent
Stine et al.

(10) Patent No.: US 9,849,372 B2
(45) Date of Patent: Dec. 26, 2017

(54) METHOD AND APPARATUS FOR IMPROVING EFFICIENCY WITHOUT INCREASING LATENCY IN EMULATION OF A LEGACY APPLICATION TITLE

(71) Applicant: Sony Interactive Entertainment Inc., Tokyo (JP)

(72) Inventors: Jacob P. Stine, East Palo Alto, CA (US); Victor Octav Suba Miura, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 13/631,812

(22) Filed: Sep. 28, 2012

(65) Prior Publication Data
US 2014/0094299 A1    Apr. 3, 2014

(51) Int. Cl.
*A63F 13/00* (2014.01)
*A63F 13/30* (2014.01)
(Continued)

(52) U.S. Cl.
CPC .............. *A63F 13/00* (2013.01); *A63F 13/12* (2013.01); *A63F 13/355* (2014.09); *A63F 13/52* (2014.09); *G06T 15/005* (2013.01)

(58) Field of Classification Search
CPC ...... A63F 13/00; A63F 13/12; A63F 2300/10; A63F 2300/203; A63F 2300/40;
(Continued)

(56) References Cited

U.S. PATENT DOCUMENTS 6,009,458 A    12/1999  Hawkins et al.
6,267,673 B1    7/2001  Miyamoto et al.
(Continued)

FOREIGN PATENT DOCUMENTS

CN    1192013 A    9/1998
CN    101346162 B    3/2012
(Continued)

OTHER PUBLICATIONS

U.S. Appl. No. 13/631,725, entitled "Replay and Resumption of Suspended Game" to Brian Michael Christopher Watson et al., filed Sep. 28, 2012.
(Continued)

*Primary Examiner* — James S McClellan
*Assistant Examiner* — Kevin Carter
(74) *Attorney, Agent, or Firm* — JDI Patent; Joshua D. Isenberg

(57) ABSTRACT

Aspects of the present disclosure describe methods and apparatuses for improving efficiency in emulation. An emulated CPU receives inputs and generates a first set of frames. The frames are stored in a buffer on the emulator. Once all of the frames in the first set of frames have been produced, the contents of the buffer may be delivered to an emulated GPU. Each frame is then rendered by the emulated GPU. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

19 Claims, 4 Drawing Sheets

(51) Int. Cl.
*A63F 13/52* (2014.01)
*A63F 13/355* (2014.01)
*G06T 15/00* (2011.01)

(58) Field of Classification Search
CPC ............ A63F 2300/407; A63F 2300/51; A63F 2300/538; A63F 2300/534; A63F 2300/552; A63F 2300/6601; H04N 7/36; H04N 7/26; H04N 9/79; G06F 17/30
USPC .......................................................... 463/42
See application file for complete search history.

(56) References Cited

U.S. PATENT DOCUMENTS

| | | | |
|---|---|---|---|
| 6,280,323 | B1 | 8/2001 | Yamazaki et al. |
| 6,402,620 | B1 | 6/2002 | Naghi |
| 7,159,008 | B1 | 1/2007 | Wies et al. |
| 7,286,132 | B2 * | 10/2007 | Kuhne ........................ 345/501 |
| 7,470,196 | B1 | 12/2008 | Joshi |
| 7,493,365 | B2 | 2/2009 | Wies et al. |
| 7,841,946 | B2 | 11/2010 | Walker et al. |
| 8,267,796 | B2 | 9/2012 | Iwakiri |
| 8,321,571 | B2 | 11/2012 | Crowder, Jr. et al. |
| 8,661,496 | B2 | 2/2014 | Perlman et al. |
| 8,935,487 | B2 | 1/2015 | Sengupta et al. |
| 9,248,374 | B2 | 2/2016 | Watson et al. |
| 9,258,012 | B2 | 2/2016 | Miura |
| 2002/0002510 | A1 | 1/2002 | Sharp et al. |
| 2002/0045484 | A1 | 4/2002 | Eck et al. |
| 2002/0065915 | A1 | 5/2002 | Anderson et al. |
| 2003/0037030 | A1 | 2/2003 | Dutta et al. |
| 2003/0190950 | A1 | 10/2003 | Matsumoto |
| 2003/0225560 | A1 | 12/2003 | Garcia et al. |
| 2004/0179019 | A1 | 9/2004 | Sabella et al. |
| 2004/0224772 | A1 | 11/2004 | Canessa et al. |
| 2004/0266529 | A1 | 12/2004 | Chatani |
| 2005/0195187 | A1 | 9/2005 | Seiler et al. |
| 2005/0288954 | A1 | 12/2005 | McCarthy et al. |
| 2006/0009290 | A1 | 1/2006 | Taho et al. |
| 2006/0080702 | A1 | 4/2006 | Diez et al. |
| 2006/0117260 | A1 | 6/2006 | Sloo et al. |
| 2006/0146057 | A1 * | 7/2006 | Blythe ........................ 345/506 |
| 2006/0160626 | A1 | 7/2006 | Gatto et al. |
| 2006/0259292 | A1 | 11/2006 | Solomon et al. |
| 2007/0060361 | A1 | 3/2007 | Nguyen et al. |
| 2007/0298866 | A1 | 12/2007 | Gaudiano et al. |
| 2008/0032794 | A1 * | 2/2008 | Ware et al. ..................... 463/32 |
| 2008/0113749 | A1 | 5/2008 | Williams et al. |
| 2008/0282241 | A1 | 11/2008 | Dong |
| 2008/0300053 | A1 | 12/2008 | Muller |
| 2009/0082102 | A1 | 3/2009 | Sargaison et al. |
| 2009/0088236 | A1 | 4/2009 | Laude et al. |
| 2009/0098943 | A1 | 4/2009 | Weber et al. |
| 2009/0162029 | A1 * | 6/2009 | Glen .................. H04N 5/44543 386/231 |
| 2009/0282139 | A1 | 11/2009 | Mejdrich et al. |
| 2009/0303245 | A1 | 12/2009 | Soupikov et al. |
| 2010/0088296 | A1 | 4/2010 | Periyagaram et al. |
| 2010/0250650 | A1 | 9/2010 | Allen |
| 2010/0259536 | A1 * | 10/2010 | Toksvig .................. G06F 9/524 345/418 |
| 2011/0013699 | A1 * | 1/2011 | Persson et al. .......... 375/240.18 |
| 2011/0098111 | A1 | 4/2011 | Saito et al. |
| 2011/0218037 | A1 | 9/2011 | Singh |
| 2011/0299105 | A1 | 12/2011 | Morrison et al. |
| 2012/0021840 | A1 | 1/2012 | Johnson et al. |
| 2012/0052930 | A1 | 3/2012 | Mcgucken |
| 2012/0142425 | A1 | 6/2012 | Scott et al. |
| 2012/0299940 | A1 * | 11/2012 | Dietrich et al. .............. 345/522 |
| 2013/0137518 | A1 | 5/2013 | Lucas |
| 2014/0004941 | A1 | 1/2014 | Watson et al. |
| 2014/0004949 | A1 | 1/2014 | Miura et al. |
| 2014/0004956 | A1 | 1/2014 | Miura et al. |
| 2014/0004957 | A1 | 1/2014 | Stine et al. |
| 2014/0004962 | A1 | 1/2014 | Miura et al. |
| 2014/0066177 | A1 | 3/2014 | Zalewski |
| 2014/0092087 | A1 | 4/2014 | Kazama et al. |
| 2014/0094313 | A1 | 4/2014 | Watson et al. |
| 2014/0094314 | A1 | 4/2014 | Watson et al. |
| 2014/0094315 | A1 | 4/2014 | Stine et al. |

FOREIGN PATENT DOCUMENTS

| | | |
|---|---|---|
| CN | 101889442 B | 10/2014 |
| EP | 1172132 A | 1/2002 |
| EP | 1225767 A | 7/2002 |
| EP | 2039404 A2 | 3/2009 |
| EP | 2040163 A1 | 3/2009 |
| JP | 2009072601 A | 4/2009 |
| JP | 2012034793 A | 2/2012 |
| RU | 2364938 C2 | 8/2009 |
| WO | 2004024259 A | 3/2004 |

OTHER PUBLICATIONS

U.S. Appl. No. 13/631,740 , entitled "Method for Creating a Mini-Game" to Brian Michael Christopher Watson et al., filed Sep. 28, 2012.

U.S. Appl. No. 13/631,785 , entitled "Pre-Loading Translated Code in Cloud Based Emulated Applications" to Jacob P. Stine et al., filed Sep. 28, 2012.

U.S. Appl. No. 13/631,803 , entitled "Adaptive Load Balancing in Software Emulation of GPU Hardware", to Takayuki Kazama and Victor Octav Suba Miura, filed Mar. 8, 2013.

U.S. Appl. No. 13/790,311 , entitled "Adding Triggers to Cloud-Based Emulated Games" to Victor Octav Suba Miura et al., filed Mar. 8, 2013.

U.S. Appl. No. 13/790,320 , entitled "Determining Triggers for Cloud-Based Emulated Games" to Victor Octav Suba Miura et al., filed Mar. 8, 2013.

U.S. Appl. No. 13/791,379 , entitled "Suspending State of Cloud-Based Legacy Application" to Jacob P. Stine et al., filed Mar. 8, 2013.

U.S. Appl. No. 13/791,420 , entitled "Conversion of Haptic Events Into Screen Events" to Brian Michael Christopher Watson and Victor Octav Suba Miura, filed Mar. 8, 2013.

U.S. Appl. No. 13/791,434 , entitled "Haptic Enhancements for Emulated Video Game Not Originally Designed With Haptic Capabilities" to Victor Octav Suba Miura and Brian Michael Christopher Watson, filed Mar. 8, 2013.

U.S. Appl. No. 61/666,665 to Brian Michael Christopher Watson et al., filed Jun. 29, 2012.

U.S. Appl. No. 61/666,628 to Victor Octav Suba Miura et al., filed Jun. 29, 2012.

U.S. Appl. No. 61/666,645 to Victor Octav Suba Miura et al., filed Jun. 29, 2012.

U.S. Appl. No. 61/666,679 to Jacob P. Stine et al., filed Jun. 29, 2012.

Co-Pending U.S. Appl. No. 61/694,718, to Gary M. Zalewski, filed Aug. 29, 2012.

Co-Pending U.S. Appl. No. 61/794,811, to Victor Octav Suba Miura, filed Mar. 15, 2013.

Final Office Action for U.S. Appl. No. 13/791,420, dated Jun. 11, 2014.

International Search Report and Written Opinion for International Application No. PCT/US2013/074813, dated May 29, 2014.

Non-Final Office Action for U.S. Appl. No. 13/790,311, dated Jun. 27, 2013.

Non-Final Office Action for U.S. Appl. No. 13/790,320, dated Jun. 18, 2014.

Non-Final Office Action for U.S. Appl. No. 13/792,664, dated Jun. 23, 2014.

Non-Final Office Action for U.S. Appl. No. 13/790,311, dated Feb. 26, 2014.

Non-Final Office Action for U.S. Appl. No. 13/791,379, dated Mar. 27, 2014.

(56) References Cited

OTHER PUBLICATIONS

Non-Final Office Action for U.S. Appl. No. 13/791,420, dated Mar. 27, 2014.
PCT International Search Report and Written Opinion for International Application No. PCT/US2013/061023, dated Jan. 23, 2014.
PCT International Search Report and Written Opinion for International Application No. PCT/US2013/061029, dated Jan. 23, 2014.
Japanese Office Action for Japan Code Application No. 2015-517495, dated Feb. 9, 2016.
Final Office Action for U.S. Appl. No. 13/631,740, dated Jul. 27, 2015.
Final Office Action for U.S. Appl. No. 13/791,420, dated Oct. 9, 2015.
Non-Final Office Action for U.S. Appl. No. 13/631,803, dated Sep. 17, 2015.
Non-Final Office Action for U.S. Appl. No. 13/790,320, dated Jul. 28, 2015.
Notice of Allowance for U.S. Appl. No. 13/631,725, dated Oct. 6, 2015.
Notice of Allowance for U.S. Appl. No. 14/183,351, dated Oct. 5, 2015.
Final Office Action for U.S. Appl. No. 13/790,311, dated Mar. 27, 2015.
Final Office Action for U.S. Appl. No. 13/791,379, dated May 13, 2015.
Final Office Action for U.S. Appl. No. 13/631,803, dated Apr. 16, 2015.
Grand Theft Auto: San Andreas Guide—Territories, https://www.youtube.com/watch?v=5d2GY-gr, May 29, 2012.
GTA San Andreas How to start a gang war, https://www.youtube.com/watch?v=9N4908kGtLO, Jan. 13, 2013.
Non-Final Office Action for U.S. Appl. No. 13/631,725, dated Mar. 16, 2015.
Non-Final Office Action for U.S. Appl. No. 13/631,740, dated Feb. 27, 2015.
Non-Final Office Action for U.S. Appl. No. 13/791,420, dated Apr. 9, 2015.
Non-Final Office Action for U.S. Appl. No. 14/183,351, dated May 11, 2015.
Playstation2, 2004, Grand Theft Auto—San Andreas.
Non-Final Office Action for U.S. Appl. No. 13/631,725, dated Sep. 12, 2014.
Non-Final Office Action for U.S. Appl. No. 13/631,740, dated Oct. 21, 2014.
Non-Final Office Action for U.S. Appl. No. 13/790,311, dated Sep. 9, 2014.
Non-Final Office Action for U.S. Appl. No. 13/631,785, dated Oct. 22, 2014.
Non-Final Office Action for U.S. Appl. No. 13/631,803, dated Oct. 14, 2014.
Non-Final Office Action for U.S. Appl. No. 13/791,379, dated Oct. 16, 2014.
Non-Final Office Action for U.S. Appl. No. 13/631,812, dated Jun. 3, 2016.
Non-Final Office Action for U.S. Appl. No. 13/791,379, dated Jul. 1, 2016.
Non-Final Office Action for U.S. Appl. No. 15/019,891, dated May 6, 2016.
Final Office Action for U.S. Appl. No. 13/790,311, dated Jul. 15, 2016.
European Search Report and Written Opinion for European Application No. PCT/US2013/047856, dated Jul. 28, 2016.
U.S. Appl. No. 61/666,628, to Victor Octav Suba Miura, filed Jun. 29, 2012.
U.S. Appl. No. 61/666,645, to Victor Octav Suba Miura, filed Jun. 29, 2012.
U.S. Appl. No. 61/666,665, to Brian Michael Christopher Watson, filed Jun. 29, 2012.
U.S. Appl. No. 61/666,679, to Jacob P. Stine, filed Jun. 29, 2012.
Non=Final Office Aciton dated Apr. 21, 2017 for U.S. Appl. No. 13/791,379.
Chinese Office Action for CN Application No. 201380045408.4, dated Sep. 20, 2016.
European Search Report and Written Opinion for EP Application No. 13841130.1, dated Oct. 4, 2016.
Final Office Action for U.S. Appl. No. 15/019,891, dated Oct. 19, 2016.
Non-Final Office Action for U.S. Appl. No. 13/631,740, dated Sep. 30, 2016.
Non-Final Office Action for U.S. Appl. No. 13/631,785, dated Nov. 3, 2016.
Non-Final Office Action for U.S. Appl. No. 15/225,361, dated Oct. 21, 2016.
Notice of Allowance for U.S. Appl. No. 13/790,320, dated Dec. 5, 2016.
Final Office Action for U.S. Appl. No. 13/791,434, dated Jun. 23, 2015.
Non-Final Office Action for U.S. Appl. No. 13/631,785, dated May 21, 2015.
Final Office Action for U.S. Appl. No. 13/791,434, dated Feb. 17, 2016.
Final Office Action for U.S. Appl. No. 13/631,785, dated Dec. 4, 2015.
Final Office Action for U.S. Appl. No. 13/631,803, dated Feb. 1, 2016.
Final Office Action for U.S. Appl. No. 13/790,320, dated Feb. 10, 2016.
Non-Final Office Action for U.S. Appl. No. 13/790,311, dated Nov. 19, 2015.
Notice of Allowance for U.S. Appl. No. 13/631,740, dated Mar. 16, 2017.
Notice of Allowance for U.S. Appl. No. 13/631,785, dated Feb. 27, 2017.
Notice of Allowance for U.S. Appl. No. 13/790,311, dated Mar. 30, 2017.
Notice of Allowance for U.S. Appl. No. 15/019,891, dated Jan. 26, 2017.
Final Office Action for U.S. Appl. No. 13/790,320, dated Jan. 15, 2015.
Final Office Action for U.S. Appl. No. 13/631,725, dated Dec. 19, 2014.
Non-Final Office Action for U.S. Appl. No. 13/791,434, dated Nov. 26, 2014.
Non-Final/Final Office Action for U.S. Appl. No. 13/792,664, dated Jul. 31, 2017.

\* cited by examiner

METHOD AND APPARATUS FOR
IMPROVING EFFICIENCY WITHOUT
INCREASING LATENCY IN EMULATION OF
A LEGACY APPLICATION TITLE

CROSS-REFERENCE TO RELATED APPLICATION

This application is related to commonly-assigned, provisional application Ser. No. 61/666,628, filed Jun. 29, 2012, and entitled "DETERMINING TRIGGERS FOR CLOUD-BASED EMULATED GAMES", the entire disclosures of which are incorporated herein by reference.

This application is related to commonly-assigned, provisional application Ser. No. 61/666,645, filed Jun. 29, 2012, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, provisional application Ser. No. 61/666,665, filed Jun. 29, 2012, and entitled "CONVERSION OF HAPTIC EVENTS INTO SCREEN EVENTS", the entire disclosures of which are incorporated herein by reference.

This application is related to commonly-assigned, provisional application Ser. No. 61/666,679, filed Jun. 29, 2012, and entitled "SUSPENDING STATE OF CLOUD-BASED LEGACY APPLICATIONS", the entire disclosures of which are incorporated herein by reference.

This application is related to commonly-assigned, co-pending application Ser. No. 13/631,725, filed the same day as the present application, and entitled "REPLAY AND RESUMPTION OF SUSPENDED GAME" to Brian Michael Christopher Watson, Victor Octav Suba Miura, Jacob P. Stine and Nicholas J. Cardell, filed the same day as the present application, the entire disclosures of which are incorporated herein by reference.

This application is related to commonly-assigned, co-pending application Ser. No. 13/631,740, filed the same day as the present application, and entitled "METHOD FOR CREATING A MINI-GAME" to Brian Michael Christopher Watson, Victor Octav Suba Miura, and Jacob P. Stine, the entire disclosures of which are incorporated herein by reference.

This application is related to commonly-assigned, co-pending application Ser. No. 13/631,785, filed the same day as the present application, and entitled "PRE-LOADING TRANSLATED CODE IN CLOUD BASED EMULATED APPLICATIONS", to Jacob P. Stine, Victor Octav Suba Miura, Brian Michael Christopher Watson, and Nicholas J. Cardell the entire disclosures of which are incorporated herein by reference.

This application is related to commonly-assigned, co-pending application Ser. No. 13/631,803, filed the same day as the present application, and entitled "ADAPTIVE LOAD BALANCING IN SOFTWARE EMULATION OF GPU HARDWARE", to Takayuki Kazama and Victor Octav Suba Miura, the entire disclosures of which are incorporated herein by reference.

FIELD OF THE DISCLOSURE

The present disclosure is related to video game emulation. Among other things, this application describes a method and apparatus for reducing the latency in emulation of a computer game program.

BACKGROUND OF THE INVENTION

In a cloud-based gaming system the majority of the processing takes place on the cloud-based server. This allows the client device platform that is communicating with the cloud-based server to have minimal processing power. However, shifting the processing requirements to the cloud increases the possibilities of latencies disrupting the game playing experience. For example, in a first-person shooter game long latencies may reduce a user's reaction time, and therefore cause the user to be shot when he would otherwise have had time to avoid an incoming attack.

The latencies in a cloud-based gaming system may originate from several different sources such as, the network, the client side, the server side, or any combination thereof. By way of example, latencies may be caused by congestion on the network. If a network does not have sufficient bandwidth, the data transfers between the cloud-based gaming system and the client device platform may be delayed. Latencies on the client side may be a result of buffering the incoming data, or even due to variations in the refresh rate of the client's monitor. Additionally, latencies originating on the server side may include the time it takes to process input data in order to return output data to the client device platform. Therefore, increasing the speed that a cloud-based server processes data may result in substantial reductions in the latency of the system.

On a cloud-based system, the client device platform and the network speed may vary between many users. However, the processing capabilities of the server side are the same for each user of the system. Therefore, reductions in latency on the server side will decrease the latency for all users of the system. One solution for increasing the processing speed on the server is to have the cloud-based gaming system run as many operations in parallel as possible. However, running operations in parallel may not help reduce latencies when a game is first started, because at the initiation of the game there may not be any data buffered for the cloud-based gaming system to operate on. Therefore, running operations in parallel during the initiation of a game may not reduce latencies.

It is within this context that aspects of the present disclosure arise.

DETAILED DESCRIPTION OF THE DRAWINGS

Figure 1:
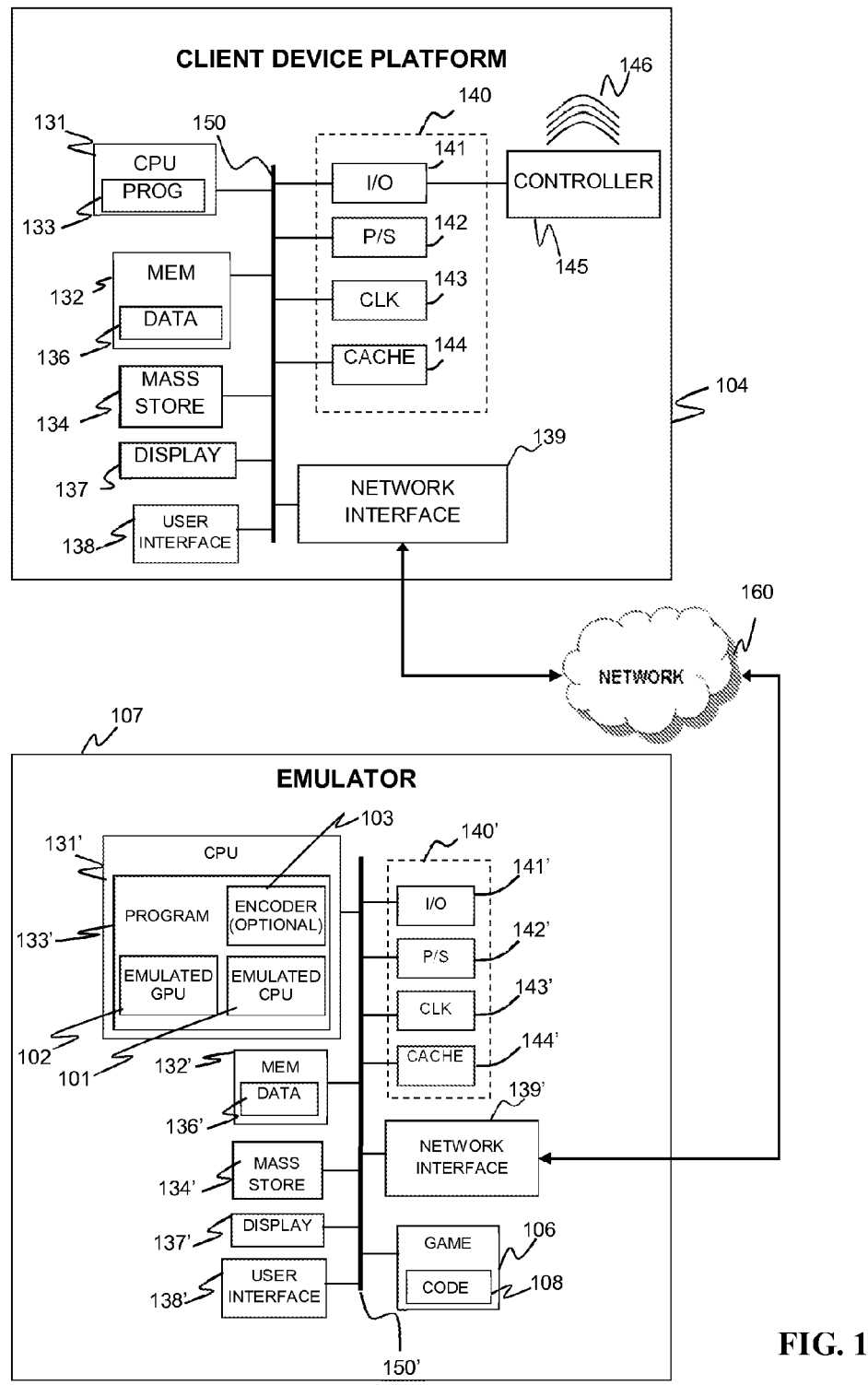
FIG. 1 is a schematic diagram of a client device platform and an emulator communicating over a network.

Although the following detailed description contains many specific details for the purposes of illustration, anyone of ordinary skill in the art will appreciate that many variations and alterations to the following details are within the scope of the present disclosure.

Accordingly, the aspects of the present disclosure described below are set forth without any loss of generality to, and without imposing limitations upon, the claims that follow this description.

Aspects of the present disclosure, describe a method and apparatus may be used to enhance efficiency in emulation of a computer program that involves emulation of both a central processing unit (CPU) and a graphics processing unit (GPU). Certain aspects are particularly advantageously for reducing the latency of the emulation of a computer game over a cloud-based network, particularly where the bottlenecks in processing that can lead to latency are due to the CPU as opposed to the GPU. As used herein, the term "latency" refers to the time delay between the generation of a game input by a client device platform when the game is in a first state and the display of the second state of the game by the client device platform. The game is advanced from the first state to the second state by the emulator processing the game inputs and delivering the resulting frame depicting the second state back to the client device platform. Aspects of the present disclosure describe an emulator that is configured to emulate a client device platform. The emulator may be comprised of an emulated central processing unit (CPU), an emulated graphics processing unit (GPU), and an emulated encoder, each of which may be operated in parallel. However, in order reduce the latency in the emulator, the emulated GPU is delayed until a first set of frames is generated by the emulated CPU. Delaying the start of the emulated GPU allows the emulated GPU to have multiple frames to operate on from the start instead of having to process a single frame at a time. Once the buffer has been built up, the emulated GPU may begin processing frames in parallel with the emulated CPU.

General-purpose cloud server architectures have aggressive power-saving features that create some latency between the time a thread begins processing data and the point when the CPU achieves maximum compute throughput. Therefore it is advantageous to queue as sizable workload as possible before starting the GPU thread, so that the GPU thread has the minimum potential of draining its workload before the frame has been completed. If the GPU runs out of work ahead of time, the thread will fall asleep and will suffer compute throughput latency when new work is submitted. 2. Cloud server operating systems distribute threads across many cores in round-robin fashion to improve heat dissipation and extend CPU component lifespans (rate varies by OS configuration, 2 ms to 10 ms windows are common for servers configured to deliver interactive multimedia content). Each time a thread is switched to a different core the new core's L1 and L2 caches must be re-primed. When a task, such as the GPU, is able to execute its entire workload quickly without stalls, it increases the likeliness that most or all work is done within a single core instance, and lessens performance lost due to the thread being shifted to a new core. But if the thread stalls frequently during the course of generating a single frame, the operating system may decide to shift it across several different cores in an effort to load-balance against other busier threads. 3. The synchronization model does not benefit the CPU other than by way of simplifying the CPU-GPU communication model so that the CPU is able to spend less time determining if it must await GPU frames to complete. Since the CPU is commonly the latency issue, increasing GPU slightly in favor of reducing the CPU latency more substantially results in an overall latency reduction. However, this may change with the advent of APU processing (integrated CPU and GPU, where-by using the GPU resources can negatively impact available compute power along the CPU pipeline). 4. The model scales well to running multiple instances on a single cloud server which, in turn, can significantly reduce operational cost of the product. By having GPU jobs execute in short, efficient chunks, e.g., at 16 ms (60 hz) or 32 ms (30 hz) intervals, the efficiency and priority heuristics of the operating system multitasking kernel are improved, along with L1 and L2 cache usage and power-saving features of the underlying hardware. Therefore, overall latency/throughput of concurrent emulation systems hosted from a single server is improved.

By way of example, and not by way of limitation, at the start of gameplay, a client device platform may deliver one or more inputs to the emulator over the network. The emulated CPU receives the inputs and initiates the generation of a first set of frames. When a frame is generated by the emulated GPU, it is stored in a buffer on the emulator. Once all of the frames in the first set of frames have been produced by the emulated CPU, the contents of the buffer may be delivered to the emulated GPU. Each frame is then rendered by the emulated GPU in order to create rendered frames. The rendered frames may then be delivered to an encoder. Once received by the emulated encoder, the rendered frames are encoded and delivered to the client device platform over the network.

FIG. 1 is a schematic of an embodiment of the present invention. Emulator 107 may be accessed by a client device platform 104 over a network 160. Client device platform 104 may access alternative emulators 107 over the network 160. Emulators 107 may be identical to each other, or they may each be programmed to emulate unique game program titles 106 or unique sets of game program titles 106.

Client device platform 104 may include a central processor unit (CPU) 131. By way of example, a CPU 131 may include one or more processors, which may be configured according to, e.g., a dual-core, quad-core, multi-core, or Cell processor architecture. Client device platform 104 may also include a memory 132 (e.g., RAM, DRAM, ROM, and the like). The CPU 131 may execute a process-control program 133, portions of which may be stored in the memory 132. The client device platform 104 may also include well-known support circuits 140, such as input/output (I/O) circuits 141, power supplies (P/S) 142, a clock (CLK) 143 and cache 144. The client device platform 104 may optionally include a mass storage device 134 such as a disk drive, CD-ROM drive, tape drive, or the like to store programs and/or data. The client device platform 104 may also optionally include a display unit 137 and a user interface unit 138 to facilitate interaction between the client device platform 104 and a user. The display unit 137 may be in the form of a cathode ray tube (CRT) or flat panel screen that displays text, numerals, or graphical symbols. The user interface unit 138 may include a keyboard, mouse, joystick, touch pad, game controller, light pen, or other device. A controller 145 may be connected to the client device platform 104 through the I/O circuit 141 or it may be directly integrated into the client device platform 104. The controller 145 may facilitate interaction between the client device platform 104 and a user. The controller 145 may include a keyboard, mouse, joystick, light pen, hand-held controls or other device. The controller 145 may be capable of generating a haptic response 146. By way of example and not by way of limitation, the haptic response 146 may be vibrations or any other feedback corresponding to the sense of touch. The client device platform 104 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 104 may send and receive data and/or requests for files via one or more data packets over the network 160.

The preceding components may exchange signals with each other via an internal system bus 150. The client device platform 104 may be a general purpose computer that becomes a special purpose computer when miming code that implements embodiments of the present invention as described herein.

The emulator 107 may include a central processor unit (CPU) 131'. By way of example, a CPU 131' may include one or more processors, which may be configured according to, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The process-control program 133' may include programs that emulate a different systems designed to play one or more games 106. The different system may be a so-called "legacy" system, e.g., an older system. Game programs originally configured to be run on the legacy are sometimes referred to herein as "legacy games".

By way of example, the CPU of a legacy system may be emulated by the emulated CPU 101 and the GPU of the legacy system may be emulated by the emulated GPU 102. The emulator may optionally be coupled to an encoder 103, which may be implemented on the CPU 103 or on a separate processor. The emulated CPU 101 and the emulated GPU 102 and the (optional) encoder 103 may be configured to operate in parallel. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. The display unit 137' may be in the form of a cathode ray tube (CRT) or flat panel screen that displays text, numerals, or graphical symbols. The user interface unit 138' may include a keyboard, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

Emulator 107 may access a game program 106, (e.g., a legacy game program) that has been selected by the client device platform 104 for emulation through the internal system bus 150'. There may be more than one game program 106 stored in the emulator. The game programs may also be stored in the memory 132' or in the mass storage device 134'. Additionally, one or more game programs 106 may be stored at a remote location accessible to the emulator 107 over the network 160. Each game program 106 contains executable game code 108 that is used by the emulated CPU 101 to generate the frames 212 in response to inputs 211 from the client device platform 104.

By way of example, the game program 106 that is emulated may be any game program that is not compatible with a client device platform 104. By way of example, and not by way of limitation, the game program 106 may be a legacy game designed to be played on Sony Computer Entertainment's PlayStation console, but the client device platform 104 is a home computer. By way of alternative example, the game program 106 may have been designed to be played on a PlayStation 2 console, but the client device platform 104 is a PlayStation 3 console. By way of further example and not by way of limitation, a game program 106 may have been designed to be played on a PlayStation console, but the client device platform 104 is a hand held console such as the PlayStation Vita from Sony Computer Entertainment.

Figure 2:
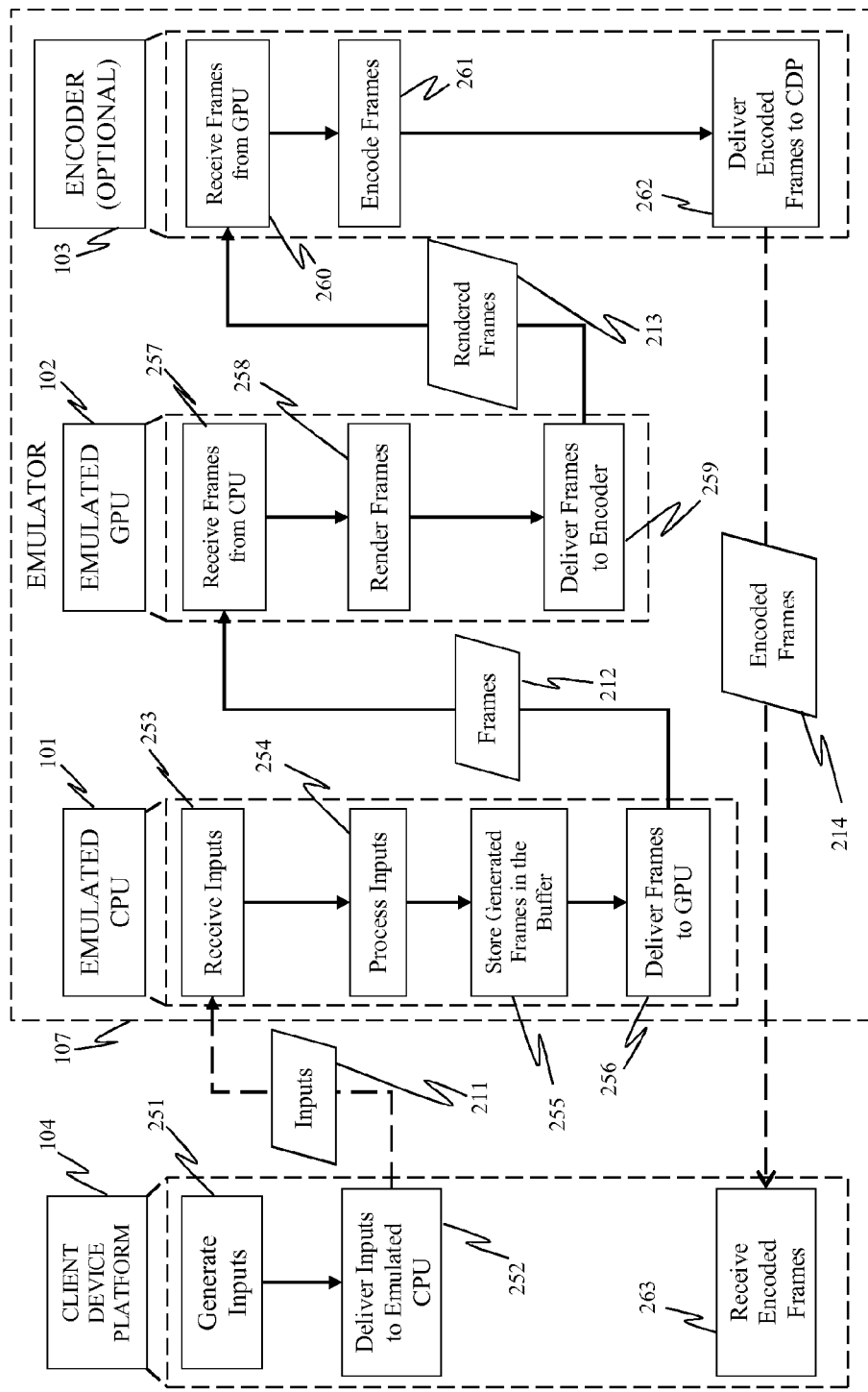
FIG. 2 is a flow diagram describing a method for reducing the latency of an emulator operating on a network.

FIG. 2 is a flow diagram of a method 200 for reducing the latency of the emulation of a legacy game 106 over a cloud-based network. FIG. 2 depicts a client device platform 104 communicating with an emulator 107 over a network 160. The dotted arrows represent data being delivered over the network 160. Rectangular boxes represent processing steps, and the parallelograms represent the various forms of data being transferred. The emulator 107 may be comprised of an emulated CPU 101 and an emulated GPU 102. Certain optional parts of the method may be implemented on an encoder 103. The emulated CPU 101, the Emulated GPU 102, and (optionally) the encoder 103 may be operated in parallel with each other.

Figure 3:
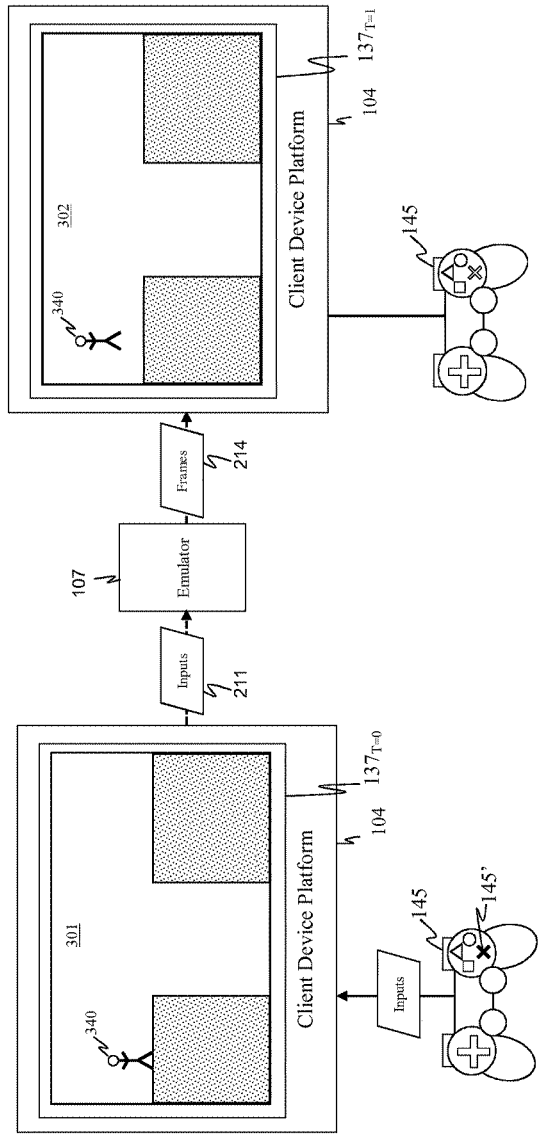
FIG. 3 is a schematic diagram of the client device platform generating a game input while displaying a game in a first state and thereafter receiving an encoded frame of the second state after the emulator has processed the game input.

The emulation method 200 begins with the client device platform 104 generating one or more game inputs 211 at block 251. By way of example, and not by way of limitation, the game inputs 211 may be commands that control the game play of a game program 106. Game inputs 211 which control the game play may include commands that are generally used by a game player to advance the game program 106 from a first state 301 to a second state 302. The game inputs 211 may be generated by a controller 145, or they may be automatically generated by the client device platform 104. Game inputs 211 may include, but are not limited to, inputs that cause a main character in a game program 106 to move to a new position, swing a sword, select an item from a menu, or any other action that can take place during the game play of a game program 106. As shown in FIG. 3, the game input 211 is generated by the game player pressing the X-button $145_X$. The pressing of the X-button $145_X$ is designated by the button being shaded, whereas the other buttons remain white.

FIG. 3 is a simplified schematic diagram of the emulation process depicting the advancement from the first state 301 to the second state 302. For purposes of clarity, the processing that takes place within the emulator 107 has been omitted from FIG. 3. The first state 301, as shown on display screen $137_{T=0}$, is comprised of the main character 340 standing to the left of a large crevasse. The second state 302, as shown on display screen $137_{T=1}$, is comprised of the main character 340 after it has been instructed, by a game input 211, to jump in the upwards direction. The labels $137_{T=0}$ and $137_{T=1}$ are used in order to indicate that a period of time has elapsed between the time the game input 211 is generated (T=0) and the time that the result of the game input 211 is first displayed on the client device platform 104 (T=1). The period of time between T=0 and T=1 is considered the latency. The large gap between the main character 340 and the ground in the second state 302 was chosen to clearly indicate a jump has been made. However, it should be noted that the time T=1 is the time at which the first frame of the jump is displayed by the client device platform 104.

Returning to FIG. 2, after the game inputs 211 have been generated, the client device platform 104 delivers them to the emulator 107 over the network 160, as indicated by block 252. The emulator 104 receives the inputs 211 with the emulated CPU 101 at block 253. At this point, the emulated CPU 101 begins processing the game inputs 211 in order to generate a first set of frames 212 at block 254. The emulated CPU may utilize the executable game code 108 of the game program 106 in order to process the game inputs 211. By way of example, and not by way of limitation, the generation of the first set of frames may include the generation of display lists for the frames, the generation of graphics primitives, or any other high level graphics processing operations. Other steps that may be performed by the emulated CPU while it is generating the first set of frames before the frames are ready for rendering by the emulated GPU include, but are not limited to video decoding, audio mixing, and the like which in emulators is often unable to be generated asynchronously from the CPU. The first set of frames 212 may be comprised of one or more individual frames, e.g. approximately two frames, depending on the specifics of the hardware being implemented. By way of example, and not by way of limitation, the optimum quantity in emulation of certain titles is typically two (2) at 60 hz. This is because the great majority of titles for certain legacy platforms, such as the PlayStation (sometimes known as the PlayStation 1 or PS1) run their CPU-side update logic at 30 hz, not 60 hz. The second frame is a tween or interlace frame meant to improve visual animation fluidity, and does not vary based on user input. Interlocking the CPU in between these 30 hz frame-pairs does not reduce latency or improve gameplay experience. This behavior can usually be determined based on the video mode selection made by the legacy title.

After each individual frame in the first group of frames 212 is processed, it is stored in a buffer as indicated by block 255. The buffer may be in the memory 132' of the emulator 107. By way of example, it may take approximately 10-12 milliseconds to finish processing the entire first set of frames 212 and store them all in the buffer. Once all of the frames in the first set of frames 212 have been stored in the buffer, the emulated CPU 101 may deliver the first set of frames 212 to the emulated GPU 102 as indicated by block 256. Alternatively, the emulated CPU 101 may send the location of first set of frames 212 to the emulated GPU 102, and the emulated GPU 102 may then retrieve the first set of frames 212 from the buffer.

At block 257 the emulated GPU 102 receives the first set of frames 212. Until this time, the emulated GPU 102 has been idle. It would appear that keeping one of the processing units idle for a period of time would increase the latency of the emulator, but the inventors have determined that this is not the case. Delaying the start of the emulated GPU 102 allows a large buffer of work to be available for the emulated GPU 102 to process. Further, the processing by the emulated GPU 102 may then be done in parallel with the emulated CPU 101 while it begins processing of a second set of frames 212'. Further, by waiting for the emulated CPU 101 to finish processing the first set of frames 212 before the emulated GPU 102 is initiated, the emulated CPU 101 may run more efficiently.

The emulated GPU 102 begins rendering the first set of frames 212 at block 258. Rendering the frames may comprise processing the frames according to a standard graphics pipeline. By way of example and not by way of limitation, a standard graphics pipeline may include vertex processing, clipping, primitive assembly, triangle setup, rasterization, occlusion culling, parameter interpolation, pixel shading, and frame buffering. Further by way of example, and not by way of limitation, the rasterization may be tile-based rasterization. Tile-based rasterization is described in detail in commonly-assigned, co-pending application Ser. No. 13/631,803, filed the same day as the present application, the entire disclosure of which has been incorporated by reference. Rendered frames 213 may then optionally be delivered to the encoder 103 at block 259. The rendered frames 213 may be delivered once all frames in the first group of frames 212 have been rendered, or each rendered frame 213 may be delivered to the encoder 103 immediately after it has been rendered. Additionally, the rendered frames 213 may be stored in a frame buffer in a memory 132' on the emulator 107 and the encoder 103 may be provided with the location of the rendered frames so that it may retrieve the rendered frames 213.

At block 260 the encoder 103 may optionally receive the rendered frames 213. Thereafter the encoder 103 may optionally initiate the encoding process. The rendered frames 213 may be encoded according to a proprietary or a standard codec. The encoder 103 may utilize I-frames, P-frames, and B-frames, or any combination thereof. By way of the example, and not by way of limitation, the emulated encoder 103 may use MPEG-4, H.264/MPEG-4 AVC, or WMV codecs. Once the frames have been encoded, the encoded frames 214 may be delivered to the client device platform 104 over the network 160. The client device platform may receive the encoded frames 214 at block 263.

Figure 4:
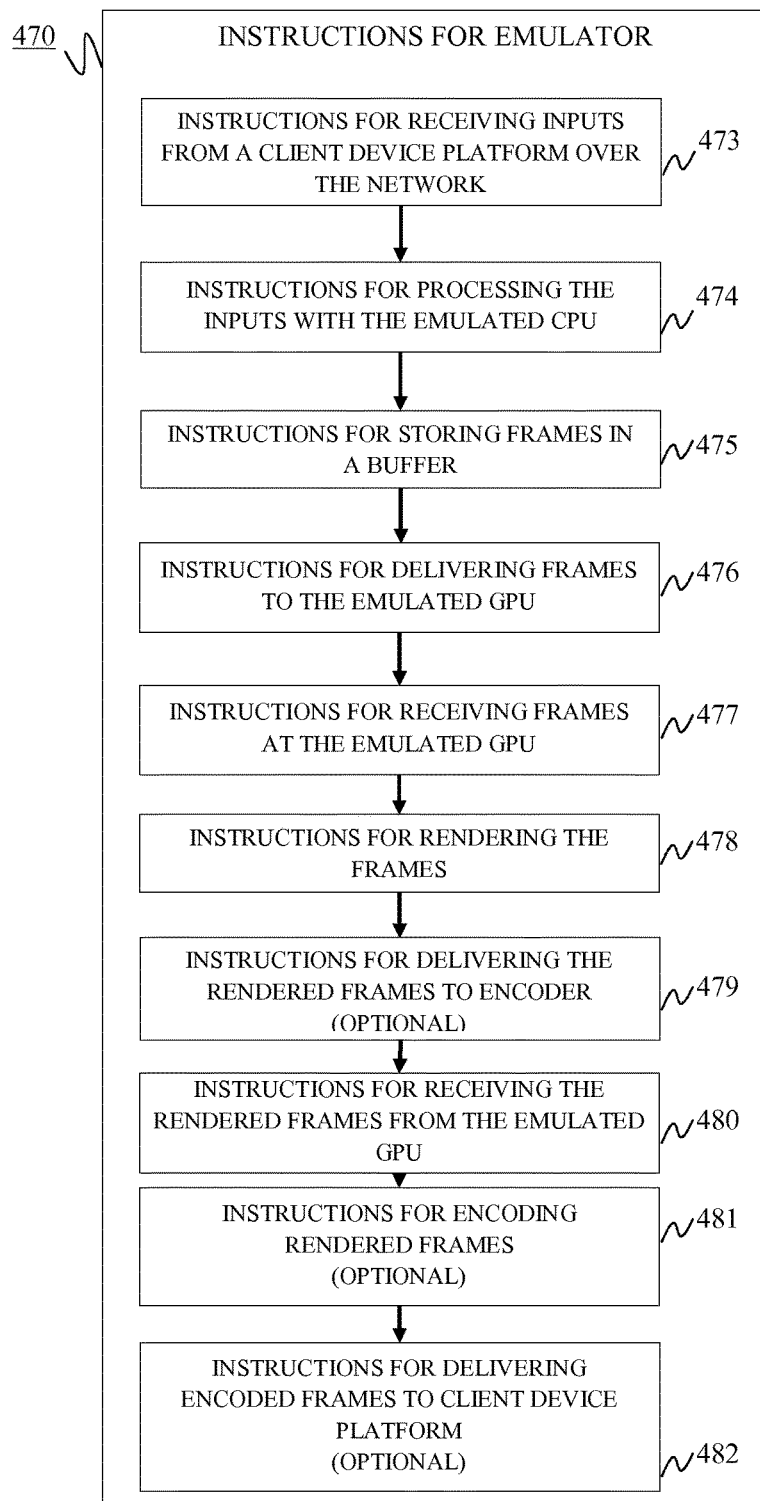
FIG. 4 is block diagram describing the instructions for how the emulator reduces the latency while processing game inputs according to an aspect of the present disclosure.

As shown in FIG. 4, a set of emulator instructions 470 may be implemented, e.g., by the emulator 107. The emulator instructions 470 may be formed on a non-transitory computer readable medium such as the memory 132' or the mass storage device 134'. The emulator instructions 470 may also be part of the process control program 133'. The emulator instructions may also be implemented through separate emulation programs such as the emulated CPU 101, the emulated GPU 102, or the emulated encoder 103, or it may be implemented by any combination thereof.

The instructions include instructions for receiving inputs 211, e.g., over the network 160 from the client device platform 104, as indicated at 473. Thereafter the emulated CPU 101 may be instructed to begin processing the inputs 211 in order to generate a first set of frames 212, e.g., by executing instructions as indicated at 474. Next, the emulator 107 may be instructed to store each of the frames from the first set of frames 212 into a buffer on the emulator 107 by executing instructions as indicated at 475. Once all of the frames from the first set of frames 212 have been generated, the emulator 107 may be instructed to deliver the first set of frames to the emulated GPU 102 by executing instructions as indicated at 476. The emulated GPU 102 may be provided with instructions for receiving the first set of frames 212 as indicated at 477. At this point the emulated GPU 102 may begin rendering the first set of frames 212 at 478. Until this point, the emulated GPU 102 may have been instructed to be idle in order to allow for a sufficient buffer to be built. The emulator 107 may be further instructed to deliver the rendered frames 213 to the emulated encoder 103 by executing instructions as indicated at 479. The emulated encoder 103 may be provided with instructions for receiving the rendered frames 213 as indicated at 480. When the emulated encoder 103 receives the rendered frames 213, it may optionally be provided with instructions for encoding the first set of rendered frames 213 as indicated at 481. Thereafter, the encoder 103 may optionally be provided with instructions for delivering the encoded first set of frames 214 to the client device platform 104, e.g., over the network 160, as indicated at 482.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A non-transitory computer readable medium containing program instructions for reducing latency in graphics processing of an emulated title over a network on an emulator having an emulated CPU and an emulated GPU, which are configured to operate in parallel, and wherein execution of the program instructions by one or more processors of a computer system causes the one or more processors to carry out a method, the method comprising:
   generating a first set of frames with the emulated CPU by processing one or more first inputs from a client device platform, wherein each frame in the first set of frames is stored in a buffer after the frame has been generated, and wherein the emulated GPU is delayed from starting processing any frames until one or more of the frames in the first set of frames have been stored in the buffer, wherein latency increase resulting from buffering the first set of frames is less than a decrease in overall latency resulting from avoiding thread stalls due to the GPU running out of frames to process;
   delivering the first set of frames from the buffer to the emulated GPU;
   rendering the first set of frames with the emulated GPU to produce a rendered first set of frames.

2. The non-transitory computer readable medium of claim 1, wherein the emulated CPU is configured to process the one or more first inputs in less than 15 milliseconds.

3. The non-transitory computer readable medium of claim 1, wherein the emulated CPU begins generating a second set of frames by processing one or more second inputs after the first set of frames have been delivered to the emulated GPU.

4. The non-transitory computer readable medium of claim 3, wherein the emulated GPU renders the first set of frames while the emulated CPU is generating the second set of frames.

5. The non-transitory computer readable medium of claim 1, wherein the network is a cloud-based network.

6. The non-transitory computer readable medium of claim 1, wherein the emulated CPU processes the first inputs according to instructions in a legacy game's executable code.

7. The non-transitory computer readable medium of claim 1, wherein the first set of frames includes one or more display lists.

8. The non-transitory computer readable medium of claim 1, wherein generating the first set of frames includes generating graphics primitives for each of the frames in the first set of frames.

9. The non-transitory computer readable medium of claim 1, wherein generating the first set of frames includes high level graphics processing.

10. The non-transitory computer readable medium of claim 1, wherein rendering the first set of frames includes using a graphics pipeline.

11. The non-transitory computer readable medium of claim 10, wherein the graphics pipeline utilizes tile based rasterization.

12. The non-transitory computer readable medium of claim 1, wherein the method further comprises:
    delivering the rendered first set of frames to an encoder; and
    encoding the rendered first set of frames to produce an encoded first set of frames.

13. The non-transitory computer readable medium of claim 12, wherein the method further comprises delivering the encoded first set of frames to the client device platform.

14. A method in an emulator having an emulated central processing unit (CPU), and an emulated graphics processing unit (GPU) which are configured to operate in parallel, the method comprising:
    generating a first set of frames with the emulated CPU by processing one or more first inputs from a client device, wherein each frame in the first set of frames is stored in a buffer after the frame has been generated, and wherein the emulated GPU is delayed from starting processing any frames until one or more of the frames in the first set of frames have been stored in the buffer, wherein latency increase resulting from buffering the first set of frames is less than a decrease in overall latency resulting from avoiding thread stalls due to the GPU running out of frames to process;
    delivering the first set of frames from the buffer to the emulated GPU;
    rendering the first set of frames with the emulated GPU to produce a rendered first set of frames.

15. An emulator configured to operate on a network, comprising:
    a processor;
    a memory coupled to the processor;
    one or more instructions embodied in memory for execution by the processor, the instructions being configured to implement a method in an emulator having an emulated CPU and an emulated GPU, which are configured to operate in parallel, the method comprising:
    generating a first set of frames with the emulated CPU by processing one or more first inputs from a client device, wherein each frame in the first set of frames is stored in a buffer after the frame has been generated, and wherein the emulated GPU is delayed from starting processing any frames until one or more of the frames in the first set of frames have been stored in the buffer, wherein latency increase resulting from buffering the first set of frames is less than a decrease in overall latency resulting from avoiding thread stalls due to the GPU running out of frames to process;

delivering the first set of frames from the buffer to the emulated GPU;

rendering the first set of frames with the emulated GPU to produce a rendered first set of frames.

16. The non-transitory computer readable medium of claim 1, wherein the emulated GPU is delayed from starting processing any frames until multiple frames in the first set of frames have been stored in the buffer.

17. The method of claim 14, wherein the emulated GPU is delayed from starting processing any frames until multiple frames in the first set of frames have been stored in the buffer.

18. The emulator of claim 15, wherein the emulated GPU is delayed from starting processing any frames until multiple frames in the first set of frames have been stored in the buffer.

19. The non-transitory computer readable medium of claim 1, wherein the GPU is idle until the one or more of the frames in the first set of frames has been stored in the buffer.

* * * * *